(12) United States Patent
White, III

(10) Patent No.: US 11,156,105 B2
(45) Date of Patent: Oct. 26, 2021

(54) VANE WITH SEAL

(71) Applicant: UNITED TECHNOLOGIES CORPORATION, Farmington, CT (US)

(72) Inventor: Robert White, III, Meriden, CT (US)

(73) Assignee: RAYTHEON TECHNOLOGIES CORPORATION, Farmington, CT (US)

(*) Notice: Subject to any disclaimer, the term of this patent is extended or adjusted under 35 U.S.C. 154(b) by 54 days.

(21) Appl. No.: 16/678,609

(22) Filed: Nov. 8, 2019

(65) Prior Publication Data

US 2021/0140326 A1 May 13, 2021

(51) Int. Cl.
| | |
|---|---|
| *F01D 5/14* | (2006.01) |
| *F01D 5/28* | (2006.01) |
| *F01D 11/00* | (2006.01) |
| *F01D 25/00* | (2006.01) |

(52) U.S. Cl.
CPC .......... *F01D 5/284* (2013.01); *F01D 5/147* (2013.01); *F01D 5/282* (2013.01); *F01D 11/005* (2013.01); *F01D 25/005* (2013.01); *F05D 2240/12* (2013.01); *F05D 2240/55* (2013.01); *F05D 2300/6033* (2013.01)

(58) Field of Classification Search
CPC ...... F02C 7/28; F01D 11/005; F05D 2220/32; F05D 2230/60; F05D 2240/12; F05D 2240/55

See application file for complete search history.

(56) References Cited

U.S. PATENT DOCUMENTS

| | | | | |
|---|---|---|---|---|
| 5,078,576 A | * | 1/1992 | Hayton | ................. F01D 5/3084 |
| | | | | 415/209.3 |
| 5,630,700 A | | 5/1997 | Olsen et al. | |
| 6,464,456 B2 | | 10/2002 | Darolia et al. | |
| 7,033,135 B2 | * | 4/2006 | Mortzheim | ............. F01D 9/065 |
| | | | | 415/115 |
| 7,389,991 B2 | * | 6/2008 | Riggi, Jr. | ................ F01D 11/00 |
| | | | | 277/500 |

(Continued)

FOREIGN PATENT DOCUMENTS

EP 1852572 11/2007

OTHER PUBLICATIONS

The Extended European Search Report for European Patent Application No. 20206029.9 dated Mar. 19, 2021.

*Primary Examiner* — Justin D Seabe
*Assistant Examiner* — Theodore C Ribadeneyra
(74) *Attorney, Agent, or Firm* — Carlson, Gaskey & Olds, P.C.

(57) ABSTRACT

An airfoil vane assembly includes a vane piece defining a first vane platform, a second vane platform, and a hollow airfoil section joining the first vane platform and the second vane platform. The first vane platform defines a collar projection therefrom. A spar piece defines a spar platform and a spar extends from the spar platform into the hollow airfoil section. The spar piece includes a radial opening defined by first and second opposed faces. The radial opening is configured to receive the collar projection, and a groove in the spar platform opening to the first face. A seal is situated in the groove. The seal seals against the collar projection. A gas turbine engine and a method of assembling a vane are also disclosed.

20 Claims, 3 Drawing Sheets

(56) References Cited

U.S. PATENT DOCUMENTS

| | | | | |
|---|---|---|---|---|
| 7,452,189 B2* | 11/2008 | Shi | ............ | F01D 5/282 |
| | | | | 416/226 |
| 7,819,628 B2* | 10/2010 | Dervaux | ............ | F01D 5/189 |
| | | | | 416/96 A |
| 7,824,152 B2* | 11/2010 | Morrison | ............ | F01D 9/042 |
| | | | | 415/135 |
| 8,142,163 B1 | 3/2012 | Davies | | |
| 8,292,580 B2* | 10/2012 | Schiavo | ............ | F01D 5/189 |
| | | | | 416/96 A |
| 9,556,750 B2 | 1/2017 | Freeman et al. | | |
| 9,726,028 B2* | 8/2017 | Marra | ............ | B22D 19/0072 |
| 9,951,639 B2* | 4/2018 | Ivakitch | ............ | F01D 11/005 |
| 9,970,317 B2* | 5/2018 | Freeman | ............ | F01D 9/042 |
| 10,281,045 B2* | 5/2019 | Sippel | ............ | F16J 15/44 |
| 10,344,606 B2* | 7/2019 | Farah | ............ | F01D 9/042 |
| 10,400,616 B2* | 9/2019 | Tuertscher | ............ | F01D 5/189 |
| 10,801,343 B2* | 10/2020 | Urac | ............ | F01D 9/042 |
| 10,830,063 B2* | 11/2020 | Freeman | ............ | F01D 5/20 |
| 2006/0038358 A1* | 2/2006 | James | ............ | F16J 15/22 |
| | | | | 277/641 |
| 2010/0068034 A1 | 3/2010 | Schiavo et al. | | |
| 2013/0126763 A1* | 5/2013 | Guo | ............ | E21B 33/062 |
| | | | | 251/1.3 |
| 2016/0123164 A1 | 5/2016 | Freeman et al. | | |
| 2016/0376899 A1 | 12/2016 | Prugarewicz et al. | | |
| 2017/0101880 A1* | 4/2017 | Thomas | ............ | F01D 11/005 |
| 2020/0248569 A1* | 8/2020 | Whittle | ............ | F01D 25/162 |

\* cited by examiner

VANE WITH SEAL

BACKGROUND

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

Airfoils in the turbine section are typically formed of a superalloy and may include thermal barrier coatings to extend temperature resistance. Ceramic matrix composite ("CMC") materials are also being considered for airfoils. CMCs have high temperature resistance. Despite this attribute, there are unique challenges to implementing CMCs in airfoils.

SUMMARY

An airfoil vane assembly according to an example of this disclosure includes a vane piece defining a first vane platform, a second vane platform, and a hollow airfoil section joining the first vane platform and the second vane platform. The first vane platform defines a collar projection therefrom. A spar piece defines a spar platform and a spar extends from the spar platform into the hollow airfoil section. The spar piece includes a radial opening defined by first and second opposed faces. The radial opening is configured to receive the collar projection, and a groove in the spar platform opens to the first face. A seal is situated in the groove. The seal seals against the collar projection.

In a further example of the foregoing, the seal is a rope seal.

In a further example of any of the foregoing, the seal includes a core, and the core comprises a ceramic-based material.

In a further example of any of the foregoing, the airfoil vane includes a sheath surrounding the core.

In a further example of any of the foregoing, the sheath includes an overbraid of metallic wires.

In a further example of any of the foregoing, the sheath includes a metallic foil.

In a further example of any of the foregoing, the seal includes a plurality of separate segments.

In a further example of any of the foregoing, the seal includes first and second ends joined by a closure feature to form a loop.

In a further example of any of the foregoing, the spar piece is metallic and the vane piece is ceramic.

A gas turbine engine according to an example of this disclosure includes a compressor section. A combustor is in fluid communication with the compressor section. A turbine section in fluid communication with the combustor. The turbine section has a vane which includes a vane piece which defines a first vane platform. A second vane platform and a hollow airfoil section join the first vane platform and the second vane platform. The first vane platform defines a collar projection therefrom. A spar piece defines a spar platform and a spar extends from the spar platform into the hollow airfoil section. The spar piece includes a radial opening which is defined by first and second opposed faces. The radial opening is configured to receive the collar projection, and a groove in the spar platform opens to the first face. The rope seal is situated in the groove, and seals against the collar projection.

In a further example of the foregoing, the first face is an outer face with respect to a centerline of the airfoil section.

In a further example of any of the foregoing, the rope seal includes a core, and the core includes a ceramic-based material.

In a further example of any of the foregoing, the gas turbine engine includes a sheath surrounding the core.

In a further example of any of the foregoing, the rope seal includes a plurality of separate segments.

In a further example of any of the foregoing, the rope seal includes first and second ends joined by a closure feature to form a loop.

In a further example of any of the foregoing, the spar piece is metallic and the vane piece is ceramic.

A method of assembling a vane according to an example of this disclosure includes inserting a spar piece into a central cavity of a hollow airfoil section of a vane piece. The vane piece has a first vane platform, a second vane platform, and the hollow airfoil section joins the first vane platform and the second vane platform. The first vane platform defines a collar projection therefrom. A collar projection extends radially outward from the outer platform, and the insert has a platform section that corresponds to the outer platform of the airfoil and that includes a radial opening which is configured to receive the collar. The spar piece includes a spar platform and a spar extends from the spar platform. The spar piece includes a radial opening defined by first and second opposed faces. The radial opening is configured to receive the collar projection, and a groove opens to the first face. A rope seal is provided and situated in the groove. The seal seals against the collar projection.

In a further example of the foregoing, the rope seal includes a core, and the core comprises a ceramic-based material.

In a further example of any of the foregoing, the rope seal includes first and second ends joined by a closure feature to form a loop.

In a further example of any of the foregoing, the spar piece is metallic and the vane piece is ceramic.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
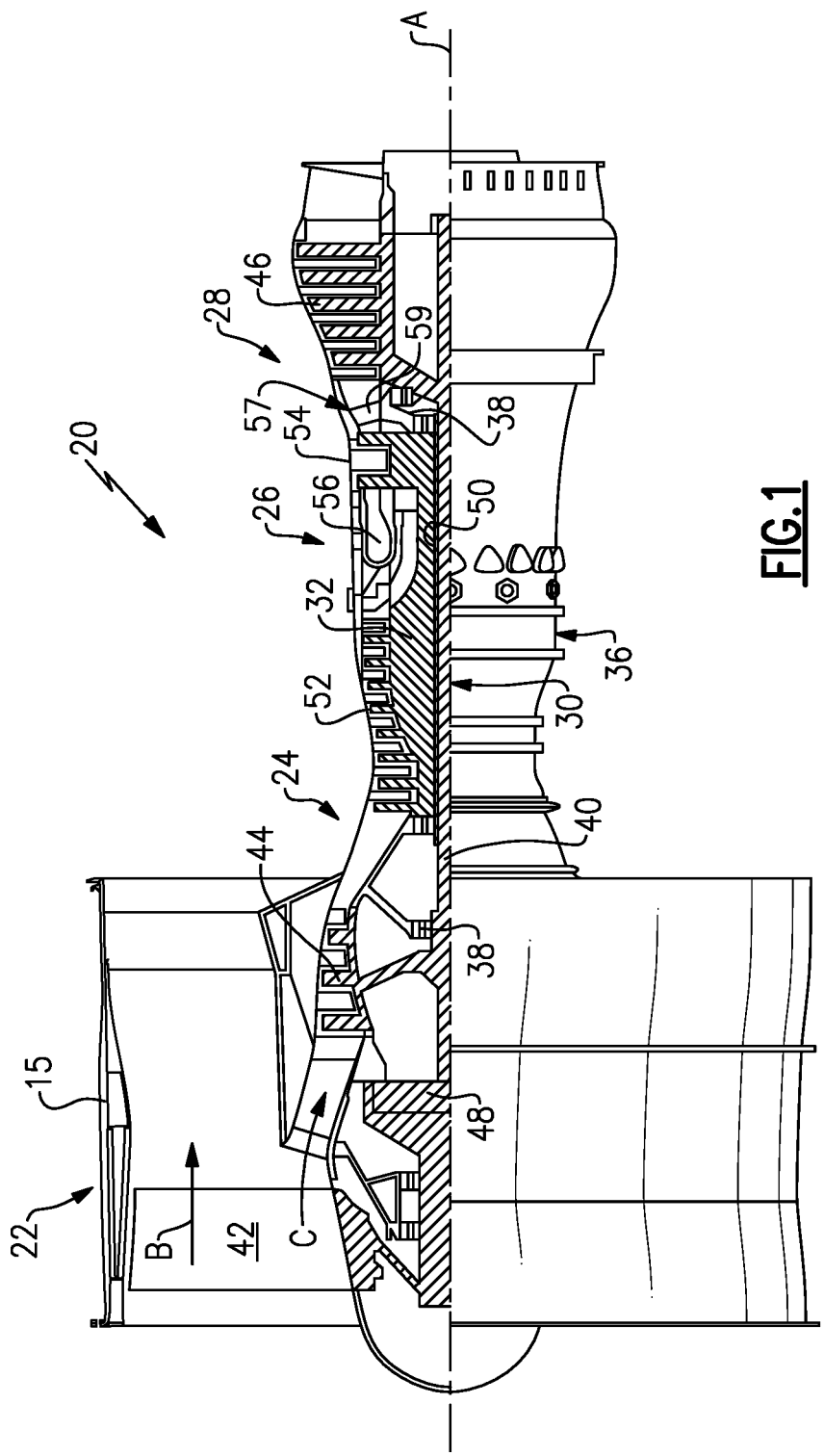
FIG. 1 schematically shows an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. Terms such as "axial," "radial," "circumferential," and variations of these terms are made with reference to the engine central axis A. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{\wedge}0.5$. The "Low corrected fan tip speed" as disclosed herein according to one non-limiting embodiment is less than about 1150 ft/second (350.5 meters/second).

Figure 2:
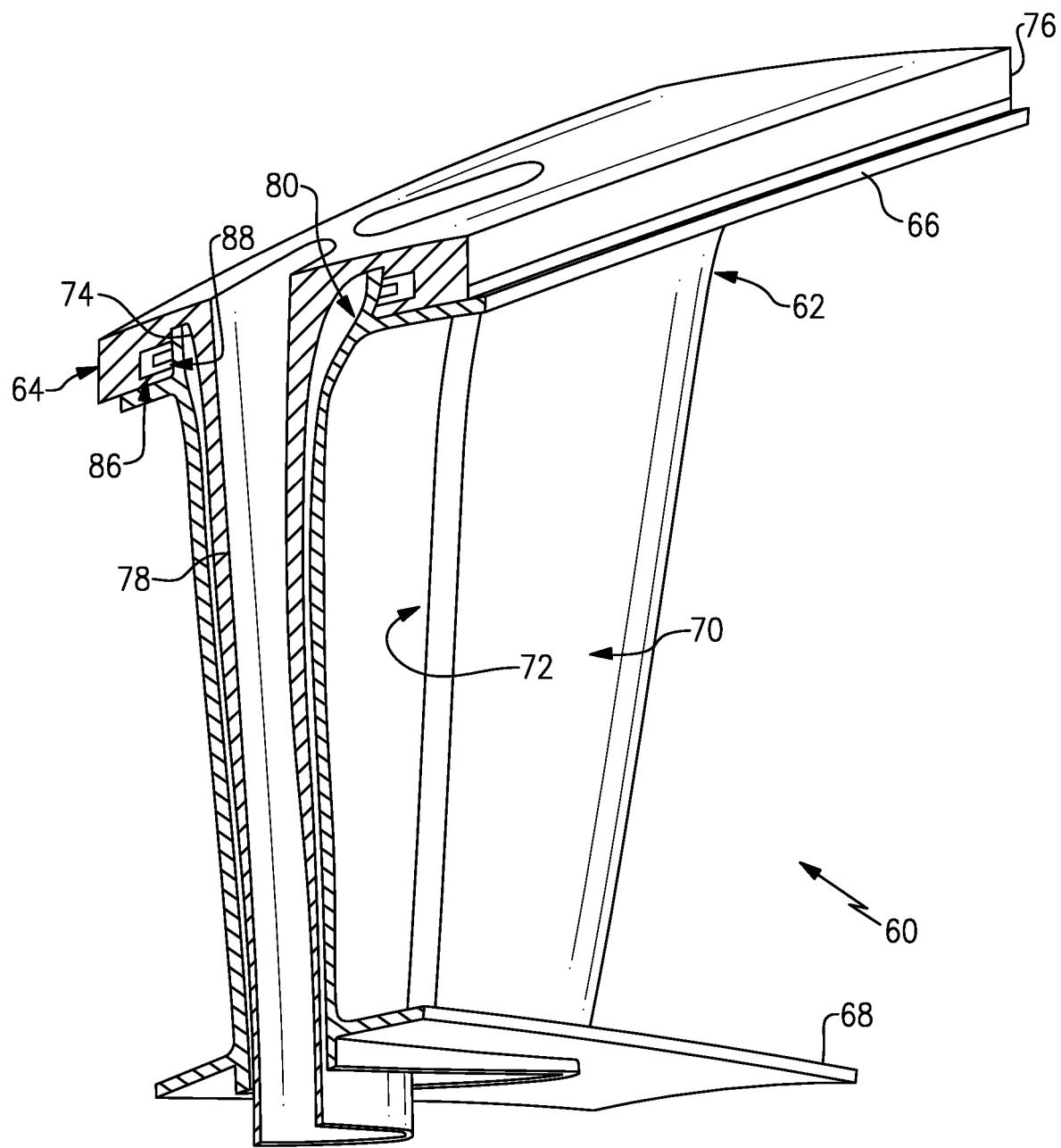
FIG. 2 schematically shows an airfoil vane assembly for the gas turbine engine of FIG. 1.

FIG. 2 illustrates a sectioned view of a representative vane 60 from the turbine section 28 of the engine 20, although the examples herein may also be applied to vanes in the compressor section 24. A plurality of vanes 60 are situated in a circumferential row about the engine central axis A. The vane 60 is comprised of a vane piece 62 and a spar piece 64. The vane piece 62 includes several sections, including first (radially outer) and second (radially inner) platforms 66/68 and a hollow airfoil section 70 that joins the first and second platforms 66/68. The airfoil section 70 includes at least one internal passage 72. The airfoil section 70 extends beyond the first platform 66 to form a collar 74 that projects radially from the first platform 66. The terminology "first" and "second" as used herein is to differentiate that there are two architecturally distinct components or features. It is to be further understood that the terms "first" and "second" are interchangeable in the embodiments herein in that a first component or feature could alternatively be termed as the second component or feature, and vice versa.

The vane piece 62 may be formed of a metallic material, such as a nickel- or cobalt-based superalloy, but more typically will be formed of a ceramic. The ceramic may be a monolithic ceramic or a ceramic matrix composite ("CMC"). Example ceramic materials may include, but are not limited to, silicon-containing ceramics. The silicon-containing ceramic may be, but is not limited to, silicon carbide (SiC) or silicon nitride ($Si_3N_4$). An example CMC may be a SiC/SiC CMC in which SiC fibers are disposed within a SiC matrix. The CMC may be comprised of fiber plies that are arranged in a stacked configuration and formed to the desired geometry of the vane piece 62. For instance, the fiber plies may be layers or tapes that are laid-up one on top of the other to form the stacked configuration. The fiber plies may be woven or unidirectional, for example. In one example, at least a portion of the fiber plies may be continuous through the first platform 66, the airfoil section 70, and the second platform 68. In this regard, the vane piece 62 may be continuous in that the fiber plies are uninterrupted through the first platform 66, the airfoil section 70, and the second platform 68. In alternate examples, the vane piece 62 may be discontinuous such that the first platform 66, the airfoil section 70, and/or the second platform 68 are individual sub-pieces that are attached to the other sections of the vane piece 62 in a joint.

The spar piece 64 defines a spar platform 76 and a (hollow) spar 78 that extends from the spar platform 76 into the hollow airfoil section 70. For example, the spar piece 64 is formed of a metallic material, such as a nickel- or cobalt-based superalloy, and is a single, monolithic piece.

Figure 3:
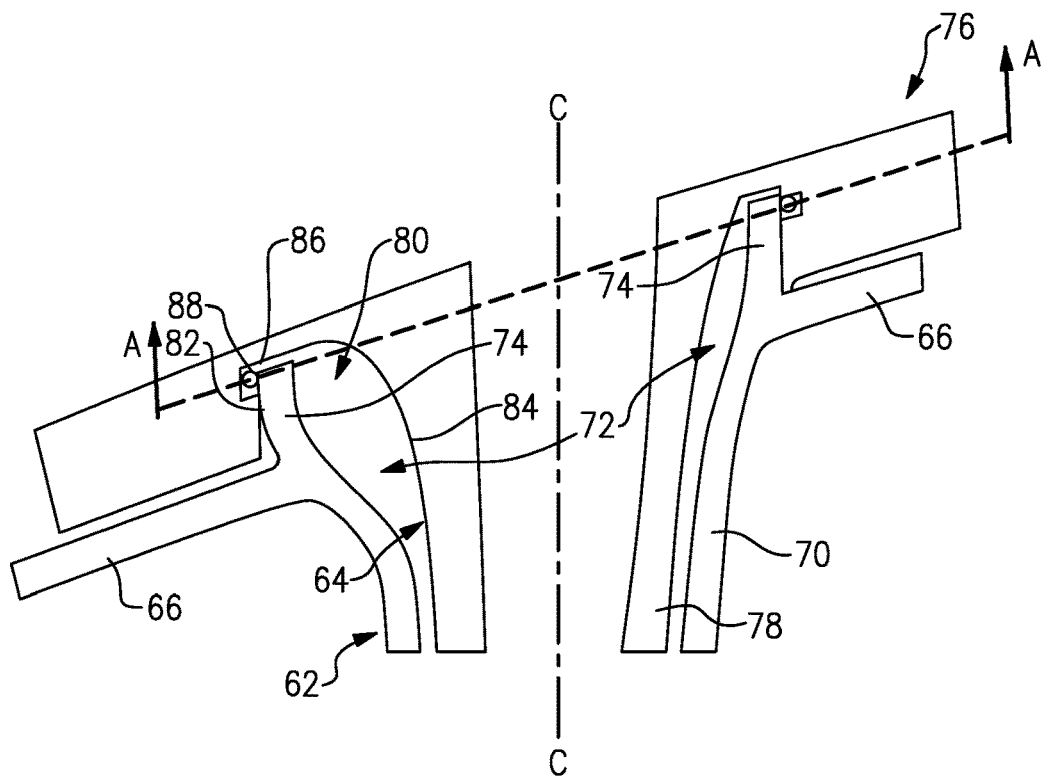
FIG. 3 schematically shows a detail view of a radially outer end of the airfoil vane of FIG. 2.

Referring also to FIG. 3, which shows a detail sectioned view of portions of the vane 60, the spar piece 64 includes a radial opening or channel 80 defined by two opposed faces 82/84 which receives the collar 74. A groove 86 is formed in the spar platform 76 which opens at the outer (with respect to a centerline C of the airfoil section 70) face 82.

A seal 88 is situated in the groove 86. Though the groove 86 in FIG. 3 has a rectangular shape, the groove 86 in other examples can have different shapes. For instance, the shape of the groove 86 can track the shape of the seal 88 (which is discussed in more detail below).

The seal 88 seals against the collar 74 of the first vane platform 66. During operation of the engine 20, cooling air, such as bleed air from the compressor section 24, may be provided through the spar piece 64 into the internal passage 72 of the airfoil section 70. The seal 88 serves to facilitate a reduction in air leakage from the internal passage 72 through the interface between the spar platform 76 and the first platform 66 of the vane piece 62.

Figure 4:
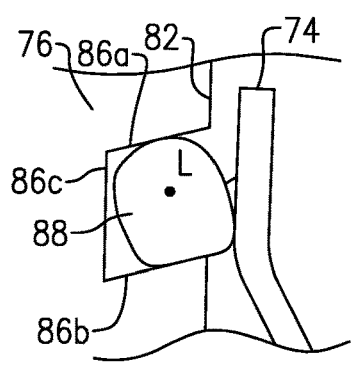
FIG. 4 schematically shows a detail view of a seal in the airfoil vane of FIGS. 2-3.

FIG. 4 shows a detail view of the groove 86 and the seal 88. In one example, the seal 88 has a generally circular cross-section, though other cross-sections are contemplated, such as oval cross sections, square cross sections, rectangular cross-sections, or the like. The seal 88 is compliant, e.g., compressible and formable. The seal 88 is compressible between radially inner and outer faces 86*a*/86*b* of the groove 86 and/or axial face 86*c* of the groove 86 and the collar projection 74 when installed in the vane 60. The seal 88 is also flexible along its length so that it can take the shape of and conform against the collar projection 74 when installed in the vane 60. Thusly the seal 88 is urged against the collar projection 74 to form a sealing relationship with the collar projection 74.

Figure 5:
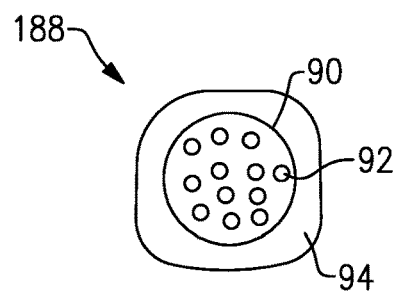
FIG. 5 schematically shows a more detailed view of the seal of FIG. 4.

The seal 88 may be comprised of a ceramic material, in one example. FIG. 5 shows a detail cross-sectional view of an example seal 188. In this example, the seal 188 has a ceramic-based core 90. The ceramic-based core 90 can include packed ceramic material, for instance, ceramic-based fibers 92. The ceramic-based fibers 92 can be braided, knitted, woven, or otherwise interspersed as would be known in the art. In a particular example, the fibers 92 are oriented along a length dimension of the seal 188. The length dimension is defined along axis L (FIG. 4), which extends into/out of the page. In the example of FIG. 5, the ceramic-based core 90 forms a rope, and the seal 188 is a rope seal.

In further examples, the rope seal 188 includes a sheath 94 surrounding the ceramic-based core 90. The sheath 94 can be an overbraid or foil that surrounds the core 90. In one example, the sheath 94 comprises a high-temperature metallic material, such as a single crystal nickel alloy or a cobalt alloy. For instance, in the overbraid example, the sheath 94 comprises an overbraid of metallic wire. In other examples, the sheath 94 comprises a ceramic-based material.

In another example the core 90 is comprises a ductile metallic-based material, and the sheath 94 comprises a ceramic-based material as well.

The sheath 94 protects the core 90 from abrasion against the collar projection 74 to maintain the structural integrity and thus the sealing relationship of the rope seal 188. The wires in the overbraid are generally taut but still permit the seal 188 to be flexible. The wires also facilitate additional compliance and conformance. For instance, under compression, the wires are able to locally shift relative to one another to thereby conform to the surface or surfaces against which it is compressed. Such conformance facilitates sealing against surface variations on the collar 74 or in the groove 86.

In another example, the seal 88 is formed of a metallic material, such as a wire ring.

Figure 6A:
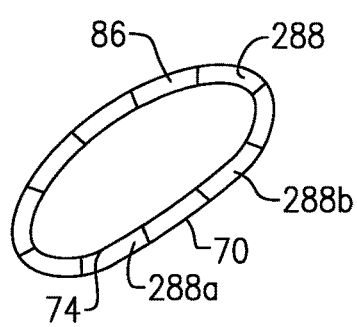
FIGS. 6A-B schematically show cross-sections of the seal of FIG. 4.
Figure 6B:
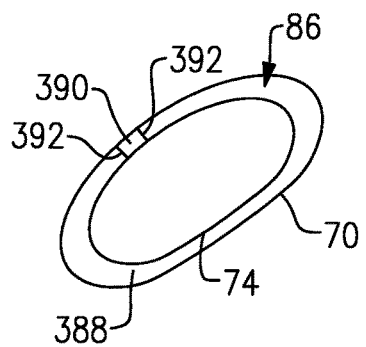

FIGS. 6A-B show cross-sections of FIG. 3 taken along section line A-A. FIG. 6A shows an example seal 288 that comprises multiple separate segments 288A/288B. In the example of FIG. 6A, the seal 288 comprises multiple segments 288*a*/288*b* around the circumference of the collar projection 74. That is, the seal 288 is an "open-loop" or non-continuous seal. The open-loop nature of the seal 288 provides improved resistance to thermally expansive hoop effects that could distort the open-loop seal 288 and/or displace the seal 288 with respect to the collar projection 74 if the collar projection 74 thermally expands at a different rate from the open-loop seal 288.

In another example, shown in FIG. 6B, an example seal 388 is a loop that tracks the circumference of the collar projection 74, e.g., a "closed-loop" seal. The closed-loop seal 388 includes a closure feature 390 which connects ends 392 to from the closed-loop rope seal 388. In one example, the closure comprises a wrapped metal foil. In another example, where the closed-loop seal 388 comprises core 90 and sheath 94 (FIG. 5) as discussed above, the sheath 94 is continuous about the entire circumference of the closed-loop seal 388 while the core 90 is non-continuous and has ends 392 joined at the closure 390. The sheath 94 thus forms the closure 390 in this example.

The vanes 60 are assembled by inserting the rope seal 88/188/288/388 into the groove 86, and then inserting the spar piece into the vane piece 62. In one example, the assembly includes securing the rope seal 88/188/288/388 in the groove with an adhesive or wax prior to the insertion.

Although the different examples are illustrated as having specific components, the examples of this disclosure are not limited to those particular combinations. It is possible to use some of the components or features from any of the embodiments in combination with features or components from any of the other embodiments.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. An airfoil vane assembly, comprising:
a vane piece defining a first vane platform, a second vane platform, and a hollow airfoil section joining the first vane platform and the second vane platform, the first vane platform defining a collar projection therefrom;
a spar piece defining a spar platform and a spar extending from the spar platform into the hollow airfoil section, the spar piece including a radial opening defined by first and second opposed faces, the radial opening configured to receive the collar projection, and an axial groove in the spar platform opening to the first face; and a seal situated in the groove, the seal sealing against an axially outer face of the collar projection.

2. The airfoil section of claim 1, wherein the seal is a rope seal.

3. The airfoil vane of claim 2, wherein the seal includes a core, and the core comprises a ceramic-based material.

4. The airfoil vane of claim 3, further comprising a sheath surrounding the core.

5. The airfoil vane of claim 4, wherein the sheath comprises an overbraid of metallic wires.

6. The airfoil vane of claim 4, wherein the sheath comprises a metallic foil.

7. The airfoil vane of claim 2, wherein the seal comprises a plurality of separate segments.

8. The airfoil vane of claim 2, wherein the seal comprises first and second ends joined by a closure feature to form a loop.

9. The airfoil vane of claim 2, wherein the spar piece is metallic and the vane piece is ceramic.

10. An gas turbine engine, comprising:
a compressor section;
a combustor in fluid communication with the compressor section;
a turbine section in fluid communication with the combustor, the turbine section having a vane including,
a vane piece defining a first vane platform, a second vane platform, and a hollow airfoil section joining the first vane platform and the second vane platform, the first vane platform defining a collar projection therefrom;
a spar piece defining a spar platform and a spar extending from the spar platform into the hollow airfoil section, the spar piece including a radial opening defined by first and second opposed faces, the radial opening configured to receive the collar projection, and an axial groove in the spar platform opening to the first face; and
a rope seal situated in the groove, the seal sealing against an axially outer face of the collar projection.

11. The gas turbine engine of claim 10, wherein the first face is an outer face with respect to a centerline of the airfoil section.

12. The gas turbine engine of claim 10, wherein the rope seal includes a core, and the core comprises a ceramic-based material.

13. The gas turbine engine of claim 12, further comprising a sheath surrounding the core.

14. The gas turbine engine of claim 10, wherein the rope seal comprises a plurality of separate segments.

15. The gas turbine engine of claim 10, wherein the rope seal comprises first and second ends joined by a closure feature to form a loop.

16. The gas turbine engine of claim 10, wherein the spar piece is metallic and the vane piece is ceramic.

17. A method of assembling a vane, comprising:
inserting a spar piece into a central cavity of a hollow airfoil section of a vane piece, the vane piece having a first vane platform, a second vane platform, and the hollow airfoil section joining the first vane platform and the second vane platform, and a collar projection extending radially outward from the outer platform, wherein the spar piece includes a spar platform and a spar extending from the spar platform, and a radial opening defined by first and second opposed faces, the radial opening configured to receive the collar projection, and an axial groove opening to the first face; and
providing a rope seal situated in the groove, the seal sealing against an axially outer face of the collar projection.

18. The method of claim 17, wherein the rope seal includes a core, and the core comprises a ceramic-based material.

19. The method of claim 17, wherein the rope seal comprises first and second ends joined by a closure feature to form a loop.

20. The method of claim 17, wherein the spar piece is metallic and the vane piece is ceramic.

* * * * *